US012265661B2

(12) United States Patent
Lazarides (10) Patent No.: US 12,265,661 B2
(45) Date of Patent: Apr. 1, 2025

(54) HUMAN COMPUTER INTERACTION DEVICES

(71) Applicant: Stefanos Lazarides, Morrisville, NC (US)

(72) Inventor: Stefanos Lazarides, Morrisville, NC (US)

( * ) Notice: Subject to any disclaimer, the term of this patent is extended or adjusted under 35 U.S.C. 154(b) by 0 days.

(21) Appl. No.: 18/127,989

(22) Filed: Mar. 29, 2023

(65) Prior Publication Data

US 2023/0229237 A1 Jul. 20, 2023

Related U.S. Application Data

(63) Continuation of application No. PCT/US2021/073136, filed on Dec. 28, 2021.

(60) Provisional application No. 63/131,131, filed on Dec. 28, 2020.

(51) Int. Cl.
*G06F 3/01* (2006.01)
*A63F 13/214* (2014.01)
*A63F 13/218* (2014.01)
*A63F 13/285* (2014.01)

(52) U.S. Cl.
CPC ............ *G06F 3/016* (2013.01); *A63F 13/214* (2014.09); *A63F 13/218* (2014.09); *A63F 13/285* (2014.09); *G06F 3/011* (2013.01); *A63F 2300/8082* (2013.01); *G06F 2203/012* (2013.01); *G06F 2203/013* (2013.01)

(58) Field of Classification Search
CPC ...... A63F 13/24; A63F 13/285; A63F 13/245; A63F 13/218; A63F 2300/1043; A63F 13/214; A63F 2300/8082; G06F 3/016; G06F 3/011; G06F 2203/012; G06F 2203/013
See application file for complete search history.

(56) References Cited

U.S. PATENT DOCUMENTS

| | | | | |
|---|---|---|---|---|
| 5,872,438 | A * | 2/1999 | Roston | G05G 9/04737 482/4 |
| 10,289,207 | B1 * | 5/2019 | Sainty | G06F 3/0346 |
| 10,423,241 | B1 | 9/2019 | Pham et al. | |
| 11,083,967 | B1 * | 8/2021 | Summit | A63F 13/285 |
| 11,614,796 | B1 * | 3/2023 | Summit | A63F 13/245 345/633 |

(Continued)

FOREIGN PATENT DOCUMENTS

WO WO-03097195 A1 * 11/2003 ............. A63F 13/10

OTHER PUBLICATIONS

International search report for PCT/US21/73136 mailed Mar. 21, 2022.

*Primary Examiner* — William Lu
(74) *Attorney, Agent, or Firm* — Thomas | Horstemeyer, LLP (57) ABSTRACT

Various examples are provided related to devices for human-computer interactions. In one example, a human computer interaction device includes a sensing platform with at least one inner zone and an outer zone. The sensing platform can provide control inputs to a computing device in response to detecting movement of a foot of a user on the sensing platform and can provide haptic feedback to the user in response to the detected movement. The haptic feedback can be provided via the at least one inner zone, the outer zone or a combination thereof.

19 Claims, 4 Drawing Sheets

(56) References Cited

U.S. PATENT DOCUMENTS

| | | | | |
|---|---|---|---|---|
| 2001/0016510 | A1* | 8/2001 | Ishikawa | G10H 1/00 463/7 |
| 2007/0205983 | A1* | 9/2007 | Naimo | G06F 3/0234 345/160 |
| 2008/0039199 | A1* | 2/2008 | Baer | A63F 13/235 463/36 |
| 2010/0292006 | A1* | 11/2010 | Terrell | A63F 13/212 463/36 |
| 2011/0009241 | A1* | 1/2011 | Lane | G06F 3/011 482/8 |
| 2011/0306425 | A1* | 12/2011 | Rivard | A63F 13/24 463/37 |
| 2012/0058809 | A1* | 3/2012 | Neveaux | A63F 3/00643 463/11 |
| 2012/0319989 | A1* | 12/2012 | Argiro | A63F 13/428 345/173 |
| 2013/0074634 | A1* | 3/2013 | Abu Al-Rubb | G05G 1/38 74/480 R |
| 2014/0035888 | A1* | 2/2014 | Levasseur | A63F 13/214 345/184 |
| 2014/0200081 | A1* | 7/2014 | Ying | A63F 13/2145 463/37 |
| 2015/0070274 | A1* | 3/2015 | Morozov | G02B 27/017 345/156 |
| 2016/0375346 | A1* | 12/2016 | Czaja | A43B 3/34 434/253 |
| 2017/0090578 | A1* | 3/2017 | Keller | G06F 3/011 |
| 2017/0128816 | A1 | 5/2017 | Demarch | |
| 2018/0021670 | A1* | 1/2018 | Price, Jr. | A63F 13/285 463/36 |
| 2018/0028094 | A1* | 2/2018 | Lee | A61B 5/4023 |
| 2019/0046871 | A1* | 2/2019 | Froy | G07F 17/32 |
| 2019/0339791 | A1* | 11/2019 | Alanajadah | G06F 3/0334 |
| 2020/0088758 | A1* | 3/2020 | Smoot | H04W 4/027 |

\* cited by examiner

HUMAN COMPUTER INTERACTION DEVICES

CROSS REFERENCE TO RELATED APPLICATIONS

This application is a continuation of the 35 U.S.C. § 371 national stage application of PCT Application No. PCT/US2021/073136, filed Dec. 28, 2021, which claims priority to, and the benefit of, U.S. provisional application entitled "HUMAN COMPUTER INTERACTION DEVICES" having Ser. No. 63/131,131, filed Dec. 28, 2020, both of which are hereby is being incorporated by reference herein in their entireties.

BACKGROUND

Computer gaming is an evolving industry. Locomotion in virtual reality (VR) spaces can be a key component of many interactive games, particularly those involving gaming and entertainment. However, many solutions for locomotion in VR spaces have feature limitations, and this is likely a sticking point for many VR applications and a hindrance to the wider adoption of VR. Effective human-machine interfaces can enhance the interaction with and enjoyment of the game or other virtual experiences.

SUMMARY

Aspects of the present disclosure are related to methods and devices for human-computer interactions. In one aspect, among others, a human computer interaction device comprises a sensing platform comprising at least one inner zone and an outer zone, the sensing platform configured to provide control inputs to a computing device in response to detecting movement of a foot of a user on the sensing platform; and the sensing platform configured to provide haptic feedback to the user in response to the detected movement, the haptic feedback provided via the at least one inner zone, the outer zone or a combination thereof. In one or more aspects, the at least one inner zone can comprise a central zone surrounded by the outer zone. The outer zone of the sensing platform can be configured to detect the movement of the foot from the central zone. The haptic feedback can be provided via the outer zone of the sensing platform, the inner zone, or a combination of both. The haptic feedback can be directional or rotational. The haptic feedback can be provided by springs, inflatable bladders or compliant materials, solenoids, magneto resistive fluids, rotational motors or actuators, linear motors or actuators, pneumatic actuators, piezoelectric actuators, ultrasonic actuators, voice coil actuators, or a custom designed motor or actuator. The haptic feedback can be provided by vibrotactile feedback, electrical stimulation, wave focusing, state or form changes via jamming, skin stretching, force feedback, or resistive surfaces. The outer zone can comprise light sensing touch technology or pressure or force sensing technology. The pressure or force sensing technology can comprise resistive, capacitive, surface acoustic wave or infrared detection, or a camera, as either part of the human computer interaction device or a standalone device, capturing similar information related to foot/body placement.

In various aspects, the at least one inner zone comprises a first inner zone and a second inner zone surrounded by the outer zone. The first inner zone of the sensing platform can be configured to detect the movement of the foot and the second inner zone can be configured to detect movement of a second foot of the user. The haptic feedback can be provided via the first and second inner zones of the sensing platform or to the first and second inner zones via the outer zone. The at least one inner zone can comprise a third inner zone configured to detect movement of the second foot of the user. The first and second inner zones can comprise a negative space and a sensing space. The sensing space can surround the negative space. The sensing space can comprise a plurality of sections disposed about the negative space. Contact with the negative space can indicate lack of movement or a resting state. In some aspects, the outer zone of the sensing platform can be detachably connected to the inner zone.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are various examples related to devices for human-computer interactions. Various human interface devices (HIDs) for interaction with computers will be discussed. These human computer interaction devices can be configured to respond to tactile input from a user; allowing use as a general purpose HID or control mechanism and can have particular advantages for applications involving spatial and/or directional input. One of the potential uses is locomotion in virtual reality (VR) spaces. Examples of VR or augmented reality applications include, but are not limited to, games, other interactive entertainment, non-interactive entertainment (e.g., movies, shows, etc.), virtual tours, virtual training, marketing, sports/athletic training, military, medical (e.g., prosthetics, rehabilitation, physical therapy, regenerative medicine, mental health applications, etc.) and other consumer, industrial or commercial uses. The human computer interaction devices can be used in conjunction with other peripherals where the device provides movement commands. Reference will now be made in detail to the description of the embodiments as illustrated in the drawings, wherein like reference numbers indicate like parts throughout the several views.

Various methods and solutions exist for locomotion in VR. First, there are native hardware solutions. Some VR solutions (e.g. headsets such as Oculus, PlayStation® VR, and HTC Vive) allow for full freedom of locomotion from the user based on their actual locomotion in real space. This is natural and intuitive to many users; however, the user must have a large clear and open physical area to effectively interact with the VR space in this way. This locomotive method also has safety concerns. Manual handheld HI Ds, such as game controllers, also provide an intuitive solution to users. However, these can result in motion sickness as the user's movement in VR space does not correspond with their body movement in real space.

Another set of VR locomotion solutions includes supplemental hardware. Many of these supplemental hardware solutions have various benefits. For example, omnidirectional treadmills allow for, and tactile shoes mimic, natural user movements without the need for wide open real spaces. However, in their current state, many of these supplemental hardware products have practical and technical limitations and may not be optimally applicable to a significant variety of uses.

In addition, there are software solutions, which include, as examples, teleportation in the VR space or programmed correspondence of movement in VR space with specific movements of specific body parts in real world space. These cost less and have fewer practical limitations than the aforementioned solutions. However, most software solutions don't allow for optimal, varied or dynamic enough interactions within the VR space.

Looking at these solutions, there is a clear need for an improved VR locomotion solution before VR can fulfill its market potential. This disclosure describes products that can provide a VR movement solution which is seamless and intuitive to a user and easily applicable to wide variety of VR uses and scenarios. It can combine many of the best features of some of the products and solutions while providing unique advantages of its own.

Figure 1A:
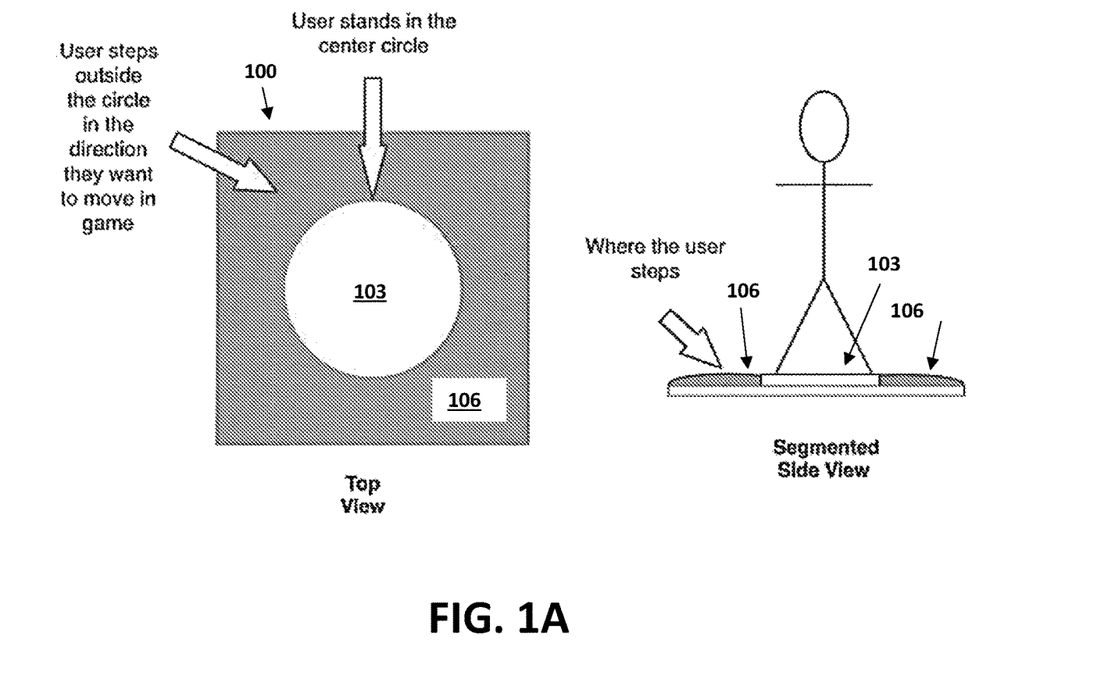
FIG. 1A illustrates an example of a human computer interaction device, in accordance with various embodiments of the present disclosure.

Referring to FIG. 1A, shown is an example of a human computer interaction device 100. The device 100 contains a physical platform with, e.g., two designated zones, a substantially central or inner zone 103 and a substantially outer zone 106. The central or inner zone 103 may or may not comprise a substantially neutral or negative zone and the outer zone 106 may or may not comprise a directional sensing space. Tactile sensing can be provided for one or both of the central zone 103 and the outer zone 106. The user stands in the central or inner zone 103, and steps outside the central or inner zone 103 onto the outer zone 106 in accordance with how the user wishes to interact with the VR space (e.g., the user can step into the outer zone 106 in the direction the user wishes to move in a virtual reality game). Sensors in the outer zone 106 can detect the user's step and provide signals to the computer as inputs to the VR space. The device 100 can also be configured such that the user can step into the central zone 103 from the outer zone 106, where sensors can detect the user's movement.

The sensors can respond to touch, pressure, weight shifts or combinations thereof. For instance, the device can incorporate one or more of light sensing touch technology similar to touch interfaces, pressure or force sensing technology such as, e.g., resistive, capacitive, surface acoustic wave and infrared detection, and/or accelerometers or weight sensors configured in series to read or sense foot placement and pressure. The sensors can be built into the materials (e.g., interwoven into the materials) of the device 100 or can standalone sensor with materials overlaid on top of them. Touch sensors can be singular points of contact, or arrays of sensors such as Tactonic sensing mats. Cameras detecting movement and placement of the foot/body, either incorporated into the mat or as a standalone device from the mat, can also be used in lieu of, or in conjunction with, pressure or touch sensors that are part of the mat. The sensors can be configured to communicate with VR hardware or software without the need for additional desktop software. A combined hardware setup can function to serve both the touch response and foot placement as well as haptic feedback (e.g., the accelerometers can read pressure or force, or a direct interface can be provided between the light sensor and haptic interface). Haptic technologies can be used to provide physical tactile stimulus to accentuate or mirror the action in the digital VR space.

While the specification refers to inner and outer zones these zones can also be referred to as haptically enabled zones. Additionally, while the specification refers to inner and outer zones these zones can also be referred to as first and second zones. Furthermore, these inner and outer zones may or may not represent a substantially neutral inner zone and a directional sensing outer zone.

The human computer interaction device 100 can include haptic technology to provide user interaction feedback. Haptic patterns can accentuate the feeling of movement in a given direction or rotation, though other patterns as dictated by the user/programmer can also be generated. Haptic sensations can be generated inwards from the perimeter along the axis where the user steps, nondirectionally once the user's step is sensed, or in another direction and/or pattern as dictated by the developer and/or player. Haptic patterns may also vary with user intention and gaze direction. For example, if a user steps forward the user can feel repeated step effects that can increase in speed as the user leans harder (or applies more force) on the forward foot and slow down with application of more weight (or force) on the back foot. In some implementations, direction of the foot placement on the outer zone 106 can determine the direction of movement. For example, rotating the foot left or right can adjust movement in that direction. In some cases, the gaze direction can also be monitored to determine or change the direction of movement. For instance, if the user gazes in a direction (left or right) consistent with the foot direction, the the direction of movement can be changed in that direction in the VR space. If a user steps to the side, the combination of gaze direction and the direction of the foot could determine whether the user is trying to walk in that direction or move to the side and play different haptic effects for each situation. For instance, stepping to the side while gazing forward can result in a sideways movement without changing the view orientation of the user in the VR space.

Figure 1B:
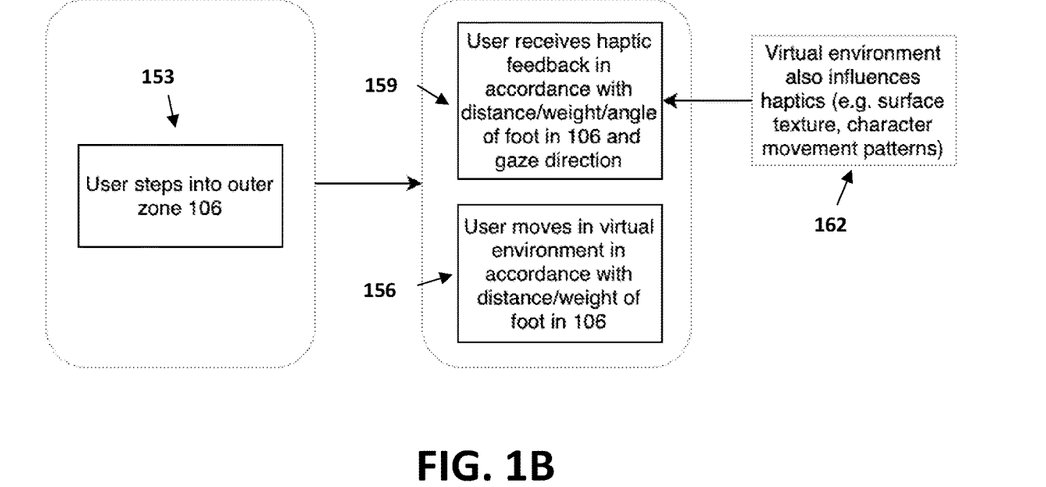
FIG. 1B illustrated an example of operation of the human computer interaction device, in accordance with various embodiments of the present disclosure.

Referring to FIG. 1B, shown is an example of the operation of the human computer interaction device. As shown in 153, the user can step on the outer zone 106 to initiate movement in the VR space. For example, the combination of foot placement, direction and/or gaze direction can determine the movement direction. At 156, the user moves in the virtual environment or VR space in response to the step. The virtual movement can be based upon the distance, force, etc. of the user's step, and can include the gaze of the user. At 159, haptic feedback can be provided to the user in accordance with the step distance, force, angle of foot, and/or gaze direction. The haptic feedback can be influenced by the virtual environment 162. For example, surface texture or obstacles, character movement characteristics or patterns, etc. can be accounted for in the haptic feedback. The haptic technology can include, e.g., motors or actuators situated along the perimeter of the device 100, or underneath or within the platform that the user stands on. Actuators can also be laid out across the top of the platform to create a sensation of directional movement across the top of the device 100. The motors and/or actuation methods can include, but are not limited to, solenoids, voice coils, motors, rotational actuators, linear motors or actuators, piezo actuators, magneto resistive fluids, ultrasonic transducers, hydraulics, pneumatics, and other haptic devices.

In some embodiments, actuators can be laid on top of the platform, such as a haptic skin of actuators laid across the top of the device 100 or can be located elsewhere on the platform. Soft surface haptics can be incorporated into the device 100, such as remote actuation and wave focusing methods through soft materials. For example, arrays of actuators situated within either the outer or inner zone of the mat at some distance from the foot can focus waves through a time reversal method localized at the user's foot through a soft material (such as silicon or foam) to create a haptic sensation corresponding to the user's movement in the virtual space. Remote actuation and wave focusing methods may also be used in conjunction with harder surfaces/materials. Jamming methods such as particle jamming, layered jamming, jamming of fluids or emulsions, semi-solid jamming, jamming of foam materials, or some combination of the aforementioned can also be used. The human computer interaction device 100 can include springs or inflatable bladders, or other inflatable soft/compliant materials from air or fluidic materials, that can generate a haptic sensation in a given pattern or direction. Directional springs placed in, e.g., the outer zone 106 can help create a sense of direction, e.g., by pushing against the user's foot (or a surface underneath their foot) in a given direction to help facilitate movement in that direction. Springs may be situated at an angle and non-electronically implemented, or actuated and controlled electronically, including the direction and degree of resistance provided by individual springs. Shiftable plates, mini platforms, or skin stretching methods via other shiftable contact points may also be used to create this feeling. Layered materials can also be used to give a sense of directional pushing movement, e.g., without machine input. For example, foam rubber ridges could be angled and situated on the mat in such a way as to accentuate movement in a direction or rotation, for instance if the ridges are triangular in shape and have greater lengths on one side than others this can affect the feeling of placement of the foot and the "direction" the foot is moving. Similarly, if materials of differing stiffness are placed within the mat in a given pattern or formation this can also influence the feeling of the direction the foot is moving without being electronically controlled. Haptic sensations can also be generated by manipulating vibrational patterns in specific ways via actuators controlled by software and algorithms. Voice coil actuators can be laid in a specific pattern across the top of the device 100. Shear force type mechanisms can also be used, by having, for example, two or more linearly actuated components under the user's feet (either directly in contact with the foot or beneath a surface layer, and either individual points of contact or points of contact covering a broader surface area of the foot) creating pressure against the foot and moving in different directions at the same time could generate shear force sensations on the foot to generate a sense of movement. Lastly, custom motors or actuators, whose primary use case is for this application, may be incorporated to produce haptics sensations as listed in this document.

The interface with the human computer interaction device 100 can allow for users or developers to program or customize the user movement options to suit individual needs or desires. The device 100 can be configured to operate or work in conjunction with VR headset such as, e.g., Oculus, HTC Vive and/or PlayStation VR. The central or inner zone 103 and outer zone 106 can be visually differentiated for user identification. Other forms of differentiation can include, but are not limited to, tactile or material differentiation. The central zone 103 can be configured with sufficient grip to hold the user while offering enough smoothness for ease of movement. Other means for the user to differentiate between the central zone 103 and the outer zone 106 without visual observance can also be provided. The materials and construction of the device 100 can be designed or configured for comfort and/or usability of the user.

Referring to FIGS. 2A-2G, shown are examples of various human computer interaction devices 200. These devices 200 can be used by a user while seated. Each foot can have a separate platform or designated interface area 203. For example, each foot can be used to control different functions of an in-game character. In one embodiment, one foot can control rotation of the character and the other can control directional movement (e.g., front, back, left or right) in the VR space. In another embodiment, both feet can control both rotation and front, back, left and right movement, individually or together. For example, with foot rotation determining rotation and front, back, left, right foot sliding determining movement in the same coordinate. Haptics can be implemented depending on the movement of the feet, with directional haptics corresponding to front, back, left, right foot movement (facilitating a sense of moving front, back, left, or right), and a rotational haptic input to the feet whenever the feet rotate would help to facilitate a sense of rotating in the virtual space. In various implementations, two or more haptic feedbacks can be simultaneously generated to simulation more than one effect or a combination of effects. These different haptic effects can be dictated by the same actuators/actuation methods, or by different actuators/actuation methods. As a nonlimiting example, directional and rotational haptics could be initiated by one or more voice coils playing different effects for rotational and directional haptics simultaneously or one or more voice coils could play directional effects against the foot and a motor plays rotational effects by pushing a rotationally actuated surface against the foot. However, the interface can be programmed to meet other developer or user needs.

Each device 200 may have multiple mechanisms for a corresponding function or singular mechanism. Either foot can control the movement function while the opposite foot controls the alternate function, unless both are programmed to perform similar functions. The mechanisms or controls can include a negative space to signal a lack of movement or a resting state for its corresponding movement function. Each foot can have a similar form factor of mechanisms to one another or distinct or different form factors. If the mechanism is purely touch-based it may depend on the location of pressure, or the presence of pressure, to determine movement. The device 200 can be adjusted or rotated to switch the function of each foot, and the mechanism for a foot can be angled down to assist with comfort.

Figure 2A:
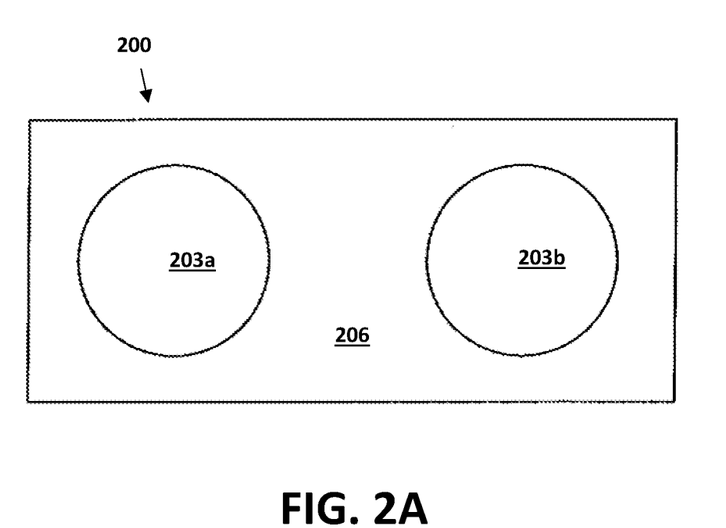
FIGS. 2A-2G illustrate examples of human computer interaction devices, in accordance with various embodiments of the present disclosure.

FIG. 2A is a top view illustrating an example of a human computer interaction device 200 comprising a physical platform with two inner zones 203 and an outer zone 206.

Figure 2B:
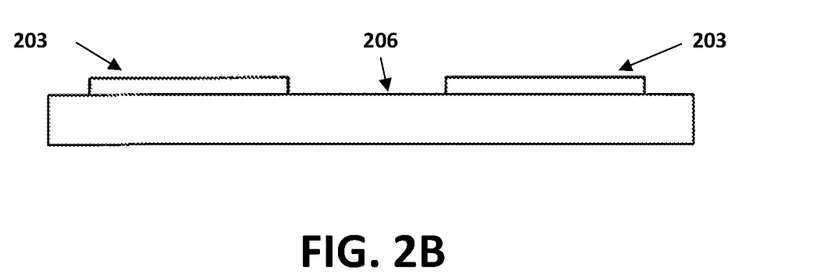
Figure 2C:
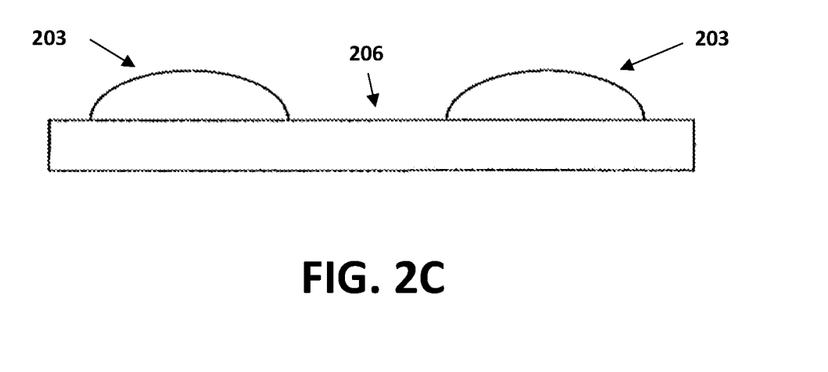
Figure 2D:
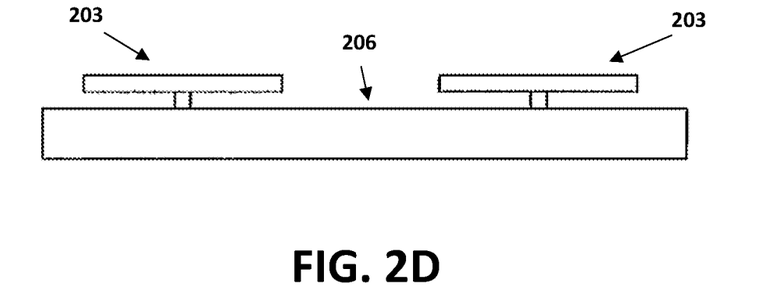

Each foot has a single designated area, i.e., inner zone 203a or 203b. The inner zones 203 can comprise, e.g., touch sensitive platforms for each food, movable platforms for each foot (e.g., similar to a "joystick" for each foot), or touch sensitive "cushions" for each foot. FIG. 2B is a side view illustrating a device 200 with the raised inner zone 203 including touch pads. In other embodiments, the surface of the inner zone 203 can be flush with the surface of the outer zone 206 or can be recessed. FIG. 2C is a side view illustrating a device 200 with the inner zone 203 comprising compressible touch responsive pads. FIG. 2D is a side view illustrating a device 200 with movable pads or control mechanisms attached to and extending over the platform similar to a joystick. Non-limiting examples of materials include force sensing resistors, touch sensing materials or cushions, hard plastics, and/or hard plastic over a compressible material, rubber and foam rubber.

Figure 2E:
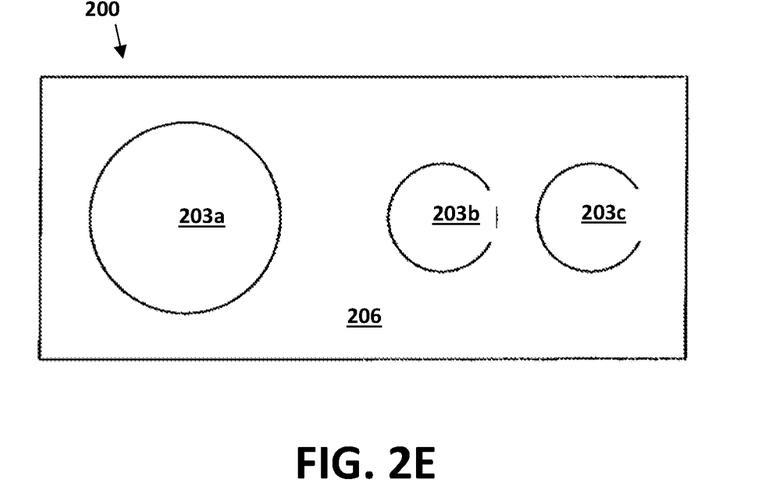
Figure 2F:
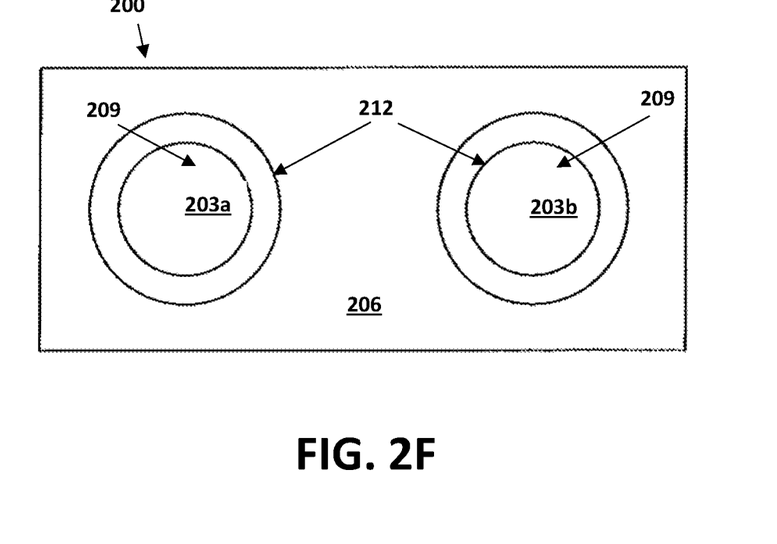

In various embodiments, multiple independently controlled zones can be provided for one or both feet. FIG. 2E illustrates an example of a human computer interaction device 200 comprising a physical platform with three inner zones 203, a first inner zone 203a for one foot and second and third inner zones 203b and 203c for the other foot. For example, inner zones 203b and 203c can be configured to control left and right rotation in the VR space. FIG. 2F illustrates an example of a device 200 where the inner zones 203 include a negative space 209 in the middle or center for non-movement and a sensing space 212 around the negative space 209 configured to detect changes in position of the foot. In some embodiments, the sensing space 212 can be divided into a plurality of different sections about the negative space 209. For example, the sensing space 212 can include two response sections similar to the example of FIG. 2E. The two sections can be configured to control left and right rotation in the VR space. In other implementations, four sections can be configured to control left, right, forward and back movement. Other form factors can be utilized for the implementation of human computer interaction devices 200.

Figure 2G:
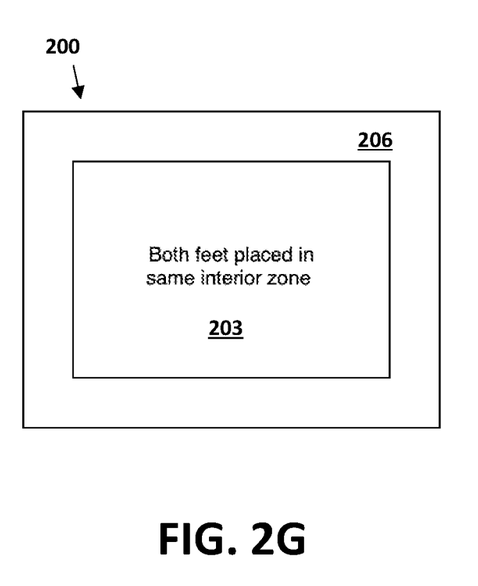

FIG. 2G illustrates an example of another human computer interaction device 200 where both feet can occupy the same general inner zone 203, but movement is sensed via means similar to those shown in FIGS. 2A-2F. Movement can be sensed for singular front back left right movements of each foot, or rotation of the feet in a set pattern. The zone occupied by both feet can be fixed or can be shiftable in every direction either to a limited or a continuous and ever repeating degree. Foot movement in this inner zone 203 can also be understood through repetitive movement of both feet. If repeated foot movement is recognized, then such a design can be configured to recognize rotation of the user's foot as rotation in a virtual space, without the need for full body rotation of the user. This is principally different from omnidirectional treadmill designs. Such a device can also be configured to incorporate haptic feedback such as that described above. The technology expressed in this design may differ from the above iteration in that a complete outer zone 206 may be removed or absent. The inner zones 203 listed in FIGS. 2A through 2F can be physically detached or separated from all or a portion of the outer zone 206, or can be absent the outer zone 206.

The devices 200 can include haptic technologies to help accentuate the feeling or sense of movement. The zones can provide haptic feedback to the user to enhance the VR experience. For example, the zones 203, platforms or sections for each foot can utilize springs, linear actuators, or other form of resistance, force, or controlled feedback. The haptics can be a function of, as nonlimiting examples, vibrotactile or pressure input. In one nonlimiting example, as a foot slides forward in a zone, a vibrotactile haptic pattern mimicking a pattern of human foot steps matching a human avatar's foot steps in a virtual space as said avatar walks backwards. The vibrotactile pattern can be administered to the bottom of either the sliding or stationary foot (or both) through an actuated solenoid or moving components connected to the surface where the foot is located or somewhere else on the device (though the pattern is still felt by the foot). This helps facilitate a sense of walking backwards, and similarly if a foot moves backwards a vibrotactile pattern is administered to help facilitate a sense of walking forward as the avatar moves forward. The haptics in this case is a function of vibration and pressure. As a foot rotates in a zone, a haptic pattern is administered underneath the foot so as to help facilitate a sense of rotating in the in the opposite direction the foot rotates, e.g., by an actuated mechanism that pushes against the foot at a curved trajectory, an array of actuators beneath the foot generating a vibrational patterns in a curved trajectory under the foot, or rigid points of contact to the foot within 203 rotating through an actuation method to create a skin stretch effect to accentuate a feeling of rotation (as nonlimiting examples). As with device 100, these could also vary with weight and distance of foot placement. This can be provided outside the platform or a holing piece of the platform or section. In some embodiments, vibrational feedback can be used to provide a sense of resistance or movement in a direction. In some cases, the sections can physically resist the player movement to create the resistive feedback in response to an applied force, or provide force feedback in another predetermined pattern. For example, a user may push a foot in a direction and a linearly actuated surface pushes back against their foot to create a sense of resistance, or they move a sliding platform which comprises a portion within zone 203 with a resistive band or spring pulling/pushing against the platform to create a sense of resistance against the platform and thus the foot. These bands or springs can be electronically actuated to create more or less resistance to the foot, or non-electronically incorporated into the platform. Cushion settings can also be used to provide a resistive or force feedback in a given direction. Other haptic technologies can also be used as previously discussed. For example, lateral patterns can also give a sense of ground movement under the feet.

Multiple forms of advanced haptics can be used such as, but not limited to, vibrotactile feedback, electrical stimulation, inflatable bladders or compliant materials, soft haptic methods as previously described, resistive surfaces such as springs or materials textured and layered in such a way as to accentuate movement in a direction. Example of the sensation that these stimuli can provide include, e.g., a sense of moving space underneath the feet or force or simulated force feedback to accentuate movement in a direction or rotation. These devices may also use software tools such as, e.g., machine learning, advanced analytics, and artificial intelligence to help identify potential movements and initiate or control haptic responses.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A human computer interaction device, comprising:
a sensing platform comprising at least one inner zone configured for foot detection within the at least one inner zone and an outer zone configured for foot detection within the outer zone, the sensing platform configured to provide control inputs to a computing device in response to detecting movement of a foot of a user on the sensing platform, the control inputs controlling user action within a virtual reality (VR) space; and
the sensing platform configured to provide continual haptic feedback to the user in response to the detected movement and virtual features within the VR space, the continual haptic feedback provided via the at least one inner zone, the outer zone or a combination thereof relative to user movement and position within the VR space to accentuate the user action within the VR space.

2. The human computer interaction device of claim 1, wherein the at least one inner zone comprises a central zone surrounded by the outer zone.

3. The human computer interaction device of claim 2, wherein the outer zone of the sensing platform is configured to detect the movement of the foot from the central zone.

4. The human computer interaction device of claim 3, wherein the haptic feedback is provided via the outer zone of the sensing platform, the at least one inner zone, or a combination of both.

5. The human computer interaction device of claim 4, wherein the haptic feedback is directional or rotational.

6. The human computer interaction device of claim 4, wherein the haptic feedback is provided by springs, inflatable bladders or compliant materials, rotational motors or actuators, linear motors or actuators, pneumatic actuators, piezoelectric actuators, ultrasonic actuators, voice coil actuators, or a custom designed motor or actuator.

7. The human computer interaction device of claim 4, wherein the haptic feedback is provided by vibrotactile feedback, electrical stimulation, wave focusing, state or form changes via jamming, skin stretching, force feedback, or resistive surfaces.

8. The human computer interaction device of claim 3, wherein the outer zone comprises light sensing touch technology or pressure or force sensing technology.

9. The human computer interaction device of claim 8, wherein the pressure or force sensing technology comprises resistive, capacitive, surface acoustic wave or infrared detection, or a camera, as part of the human computer interaction device, capturing similar information related to foot/body placement.

10. The human computer interaction device of claim 1, wherein the at least one inner zone comprises a first inner zone and a second inner zone separate from the first inner zone, the first and second inner zones surrounded by the outer zone.

11. The human computer interaction device of claim 10, wherein the first inner zone of the sensing platform is configured to detect the movement of the foot and the second inner zone is configured to detect movement of a second foot of the user.

12. The human computer interaction device of claim 11, wherein the haptic feedback is provided via the first and second inner zones of the sensing platform or to the first and second inner zones via the outer zone.

13. The human computer interaction device of claim 11, wherein the at least one inner zone comprises a third inner zone configured to detect movement of the second foot of the user.

14. The human computer interaction device of claim 1, wherein the sensing platform comprises a negative space and the at least one inner zone comprises a sensing space configured for foot detection within the sensing space.

15. The human computer interaction device of claim 14, wherein the sensing space surrounds the negative space.

16. The human computer interaction device of claim 14, wherein the sensing space comprises a plurality of sections disposed about the negative space, each of the plurality of sections configured for foot detection within that section.

17. The human computer interaction device of claim 14, wherein contact with the negative space indicates lack of movement or a resting state.

18. The human computer interaction device of claim 1, wherein two or more haptic feedbacks are simultaneously generated by the sensing platform.

19. A human computer interaction device, comprising:
a sensing platform comprising at least one inner zone configured for foot detection within the at least one inner zone and an outer zone configured for foot detection within the outer zone, the sensing platform configured to provide control inputs to a computing device in response to detecting movement of a foot of a user on the sensing platform, the control inputs controlling user action within a virtual reality (VR) space, wherein the outer zone of the sensing platform is detachably connected to the at least one inner zone; and
the sensing platform configured to provide continual haptic feedback to the user in response to the detected movement and virtual features within the VR space, the continual haptic feedback provided via the at least one inner zone, the outer zone or a combination thereof relative to user movement and position within the VR space to accentuate the user action within the VR space.

* * * * *